United States Patent
Sullivan

(10) Patent No.: US 9,106,619 B2
(45) Date of Patent: Aug. 11, 2015

(54) ELECTRONIC RENTAL SERVICE SYSTEM AND METHOD FOR DIGITAL CONTENT

(71) Applicant: ALTECH UEC (PTY) LIMITED, Mount Edgecombe (ZA)

(72) Inventor: Alan John Sullivan, Randburg (ZA)

(73) Assignee: ALTECH UEC (PTY) LIMITED, Kwazulu-Natal (ZA)

( * ) Notice: Subject to any disclaimer, the term of this patent is extended or adjusted under 35 U.S.C. 154(b) by 25 days.

(21) Appl. No.: 13/850,619

(22) Filed: Mar. 26, 2013

(65) Prior Publication Data

US 2013/0283052 A1    Oct. 24, 2013

Related U.S. Application Data

(63) Continuation of application No. 12/996,566, filed as application No. PCT/IB2009/052397 on Jun. 5, 2009, now abandoned.

(30) Foreign Application Priority Data

Jun. 6, 2008 (ZA) ................................. 2008/04955
Sep. 10, 2008 (ZA) ................................. 2008/07793

(51) Int. Cl.
*H04L 29/06* (2006.01)
*G06F 21/10* (2013.01)

(52) U.S. Cl.
CPC ............ *H04L 63/0428* (2013.01); *G06F 21/10* (2013.01)

(58) Field of Classification Search
CPC ............................ G06F 21/00; H04L 63/0428
USPC ............... 713/168, 169, 170; 380/27, 44, 270
See application file for complete search history.

(56) References Cited

U.S. PATENT DOCUMENTS

| 5,982,891 A | 11/1999 | Ginter et al. |
| 7,594,109 B2 * | 9/2009 | Minne ........................... 713/162 |
| 2002/0013898 A1 | 1/2002 | Sudia et al. |
| 2004/0123125 A1 | 6/2004 | Zuili |

(Continued)

FOREIGN PATENT DOCUMENTS

WO    2007/103700    9/2007

OTHER PUBLICATIONS

"Key-Private Proxy Re-Encryption"—Benson et al, IACR, Jan. 2009 https://eprint.iacr.org/2008/463.pdf.*

(Continued)

*Primary Examiner* — Randy Scott
(74) *Attorney, Agent, or Firm* — Nixon & Vanderhye P.C.

(57) ABSTRACT

A system encrypts digital content data with a key of a content encryption key (CEK) pair and CEK related share data available to an end user station including a source for generating source encrypted data including content data. The share data is encrypted with a first key of a second encryption key pair associated with a targeted intermediate station including a processor receiving source encrypted data and being in data communication with a portable storage device associated with the end user station, which is associated with a third encryption key pair. The processor generates intermediate station encrypted data by decrypting encrypted share data using a key of the second key pair and encrypting resulting decrypted data using a key of the third key pair. A reconstruction processor uses an algorithm and input share data to reconstruct the CEK. A decryption processor uses the reconstructed CEK to decrypt encrypted content data.

11 Claims, 4 Drawing Sheets

(56) References Cited

U.S. PATENT DOCUMENTS

| | | |
|---|---|---|
| 2005/0010611 A1 | 1/2005 | De Souza |
| 2005/0022227 A1 | 1/2005 | Shen et al. |
| 2006/0133615 A1 | 6/2006 | Bade et al. |
| 2006/0184802 A1 | 8/2006 | Ibrahim et al. |
| 2007/0055873 A1* | 3/2007 | Leone et al. ............... 713/168 |
| 2007/0124809 A1 | 5/2007 | Narin et al. |
| 2007/0223706 A1* | 9/2007 | Gantman et al. ............ 380/286 |
| 2008/0005025 A1 | 1/2008 | Legere et al. |
| 2008/0098481 A1* | 4/2008 | Lee et al. ..................... 726/26 |
| 2008/0304669 A1* | 12/2008 | Bugbee ....................... 380/278 |
| 2009/0031139 A1* | 1/2009 | Geoffrey ..................... 713/186 |

OTHER PUBLICATIONS

International Search Report for PCT/IB2009/052397, mailed Sep. 24, 2009.

International Preliminary Report on Patentability for PCT/IB2009/052397, completed Sep. 9, 2010.

Non-Final Office Action mailed Sep. 27, 2012 in parent U.S. Appl. No. 12/996,566.

* cited by examiner

ELECTRONIC RENTAL SERVICE SYSTEM AND METHOD FOR DIGITAL CONTENT

This application is a continuation application of U.S. application Ser. No. 12/996,566, filed Feb. 9, 2011, which is the U.S. national phase of International Application No. PCT/IB2009/052397, filed Jun. 5, 2009, which designated the U.S. and claims priority to South African Application No(s). 2008/04955, filed 6 Jun. 2008 and 2008/07793, filed 10 Sep. 2008, the entire contents of each of which are hereby incorporated herein by reference.

INTRODUCTION AND BACKGROUND

This invention relates to a system and method of making digital content data available to users under controlled circumstances. The invention more particularly relates to a system and method of making digitally recorded movies or cinematograph films, educational programmes, documentary and information programs available for controlled viewing by users at user stations, such as user homes.

It is known to hire from a video outlet an authorized copy of a cinematograph film for viewing on suitable equipment at home. A problem associated with the known system, infrastructure and method is that the medium on which the copy is carried may, due to prior use, be damaged, so that the copy may not be of a satisfactory standard. Furthermore, the user has to make his selection of movies at the outlet and pay for all the copies hired. The user has to pay for hiring the copy, even if the user later decides not to view the movie. Still furthermore, the user hires the copy for a limited number of hours, typically less than 24 hours, and it may happen that, due to unforeseen circumstances, an opportunity may not present itself during the period, for the user to view the movie. The current systems and methods are not flexible enough for many needs and often do not allow for digital rights management (DRM) regimes.

OBJECT OF THE INVENTION

Accordingly, it is an object of the present invention to provide and alternative system and method with which the applicant believes the aforementioned disadvantages may at least be alleviated.

SUMMARY OF THE INVENTION

According to the invention there is provided a system for making digital content data available to one of a plurality of end user stations, the system comprising:

a source comprising a processor for receiving the digital content data and for generating source encrypted data comprising at least the content data encrypted with a key of a content encryption key pair; and share data relating to the key of the content encryption key pair;

at least the share data relating to the key of the content encryption key pair being encrypted with a first key of a second encryption key pair, which second key pair is associated with a targeted intermediate station;

a data transmission path between the source and the targeted intermediate station for forwarding the source encrypted data to the targeted intermediate station;

the targeted intermediate station comprising a processor for receiving the source encrypted data;

a portable data storage device associated with the end user station, the end user station being associated with a third encryption key pair comprising a first key and a second key;

the processor at the intermediate station being configured to be placed in data communication with the portable data storage device and to generate intermediate station encrypted data by decrypting said encrypted share data relating to the key of the content encryption key pair utilizing the second key of the second key pair and encrypting resulting decrypted data utilizing a first key of the third key pair;

the portable data storage device being configured to be brought into data communication with a decryption processor at the end user station;

a content encryption key reconstruction processor configured to utilize an algorithm and input data comprising at least one of said share data relating to the key of the content encryption key pair and other data, to reconstruct the content encryption key;

the decryption processor being configured to decrypt the intermediate station encrypted data utilizing the second key of the third key pair and to use the reconstructed content encryption key to decrypt the encrypted content data.

The content encryption key pair may be a symmetric key pair and the second and third key pairs may be asymmetric key pairs. The first key of the asymmetric key pairs may be a public key and the second key of the asymmetric key pairs may be a private key.

Items with different content data may each be encrypted with a key of a respective unique content encryption key pair. A content data item may comprise data relating to sound and images of a moving picture, or data relating to sound of a sound recording. Each content data item may comprise compressed data and/or data relating to a digital rights management regime.

The intermediate station may comprise a kiosk at a conventional video letting store or the like.

The content encryption key reconstruction processor may be resident at the intermediate station, alternatively at the end user station. In the former case the intermediate station encrypted data may comprise the content data encrypted with the content encryption key, and the content encryption key encrypted with the first key of the third key pair. In the latter case, the intermediate station encrypted data may comprise the content data encrypted with the content encryption key, and the share data relating to the content encryption key encrypted with the first key of the third key pair.

The other data that is used by the algorithm of the content encryption key reproducing processor may comprise one or more of data relating to the intermediate station; data relating to the end user station; and data relating to payment for the content data.

Hence, if payment for the content data has not been made or arranged for, the content encryption key reconstruction processor would not be able to reconstruct the content encryption key required to decrypt the encrypted content data.

The decryption processor at the end user station may be housed in a sink device such as a set-top box and the third encryption key pair may be associated with the set-top box, alternatively a SIM card or other similar token associated by the set-top box.

The decrypted content data may be played out on a television screen or monitor connected to the set-top box.

The portable data storage device associated with the end user station may comprise any suitable hand carried digital data storage device. Typically, the device may comprise a general-purpose device, such as a USB memory stick, a computer memory stick, a portable computer hard drive or the like. The presently preferred device is an off the shelf Flash disc with a minimum capacity of 4 Gbytes.

Also included within the scope of the present invention, is a content encryption key reconstruction processor as herein defined and/or described as well as an intermediate station or kiosk and a set-top box comprising a content encryption key reconstruction processor as herein defined and/or described.

According to another aspect of the invention there is provided a method of making digital content data available to at least one user station, the method comprising the steps of:
- at a source, generating source encrypted data by encrypting the content data with a key of a content encryption key pair; adding share data relating to the key of the content encryption key pair; and encrypting at least the share data relating to the key of the content encryption key pair with a first key of a second encryption key pair, the second encryption key pair being associated with an intermediate station;
- forwarding the source encrypted data to the intermediate station;
- at the intermediate station, causing intermediate station encrypted data to be generated by decrypting the encrypted share data relating to the key of the content encryption key utilizing a second key of the second encryption key pair and encrypting resulting decrypted data with a first key of a third key pair, which third key pair is associated with the user station; and
- causing the intermediate station encrypted data to be made available on a portable data storage device.

BRIEF DESCRIPTION OF THE ACCOMPANYING DIAGRAMS

The invention will now further be described, by way of example only, with reference to the accompanying diagrams wherein.

DESCRIPTION OF A PREFERRED EMBODIMENT OF THE INVENTION

Figure 1:
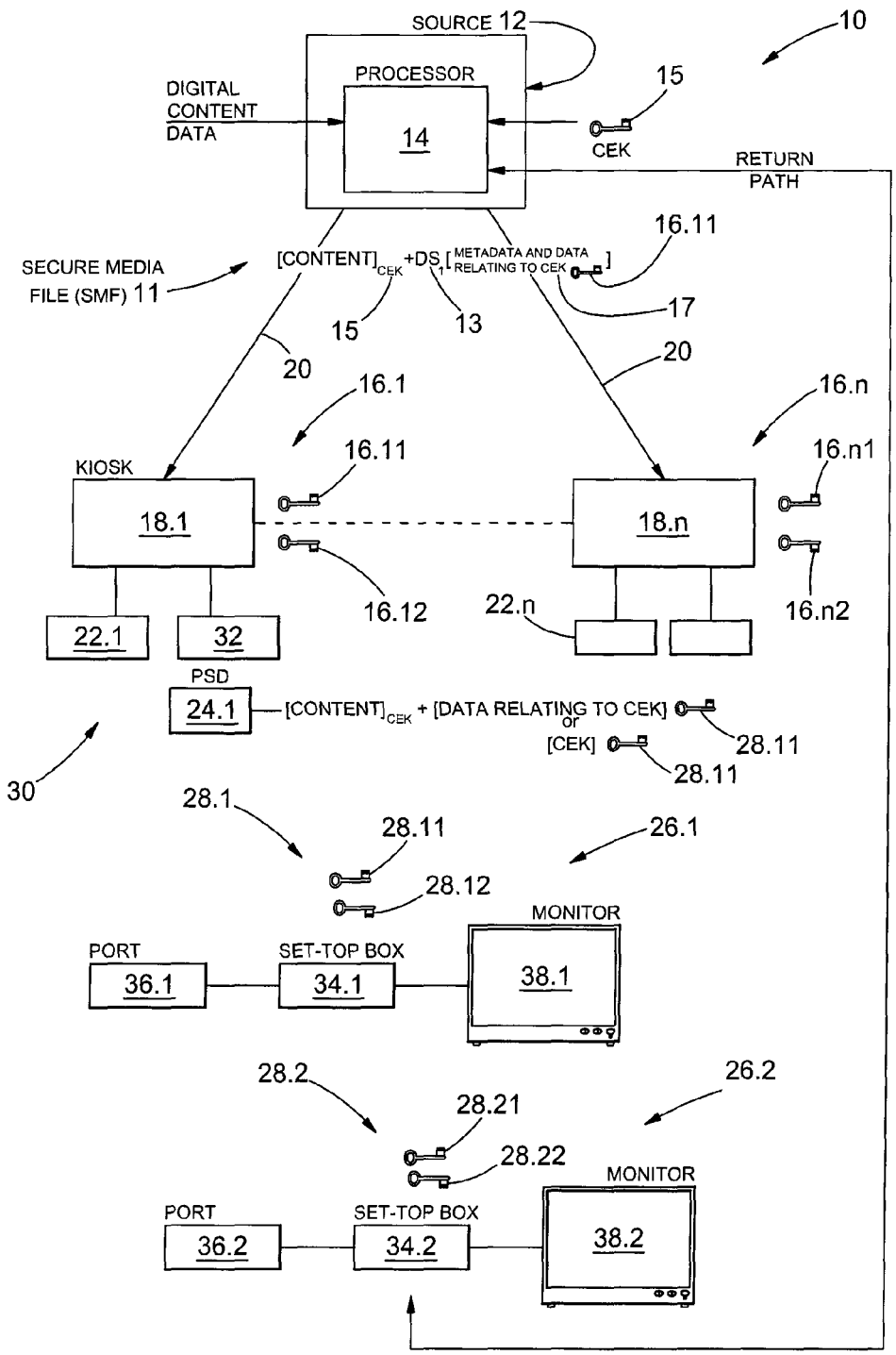
FIG. 1 is a high level block diagram of a system for making digital content data available to a plurality of user stations.

A system according to the invention for making digital content data available to one of a plurality of end user stations, is generally designated by the reference numeral 10 in FIG. 1.

The system 10 comprises, at a top level, a source 12 comprising a processor 14 for receiving the digital content data and for generating source encrypted data 11 comprising the content data encrypted with a content encryption key (CEK) 15 of a symmetric content encryption key pair and share data 17 relating to the CEK. The share data 17 relating to the CEK 15 forms part of a digital certificate 13 associated with the encrypted content data. The encrypted content data and the digital certificate are saved in a secure media file (SMF). The certificate 13, which is better shown in FIG. 3, comprises metadata, a content data item birth date (MBD) and the share data 17 relating to the CEK 15. The share data 17 relating to the CEK is encrypted with a first key 16.11 of a second encryption key pair 16.1, which second key pair is associated with a targeted intermediate station 18.1.

The digital content data may comprise digitally recorded movies or cinematograph films, educational programmes, documentary and information programs etc.

The targeted intermediate station 18.1 is one of a plurality of distributed intermediate stations 18.1 to 18.$n$.

A data transmission path 20 extends between the source 12 and the intermediate stations 18.1 to 18.$n$ for forwarding the source encrypted data 11 to the targeted intermediate station.

The targeted intermediate station comprises a secure processor 22.1 for receiving the source encrypted data 11. A portable data storage device 24.1 is associated with the end user station 26.1. The end user station is associated with a third encryption key pair 28.1 comprising a first key 28.11 and a second key 28.12. The processor 22.1 at the intermediate station is configured to be placed in data communication with the device 24.1 and to generate intermediate station encrypted data by decrypting the encrypted share data relating to the CEK utilizing the second key 16.12 of the second key pair 16.1 and encrypting resulting decrypted data utilizing a first key 28.11 of the third key pair 28.1. The intermediate station encrypted data is downloaded into the device.

Figure 2:
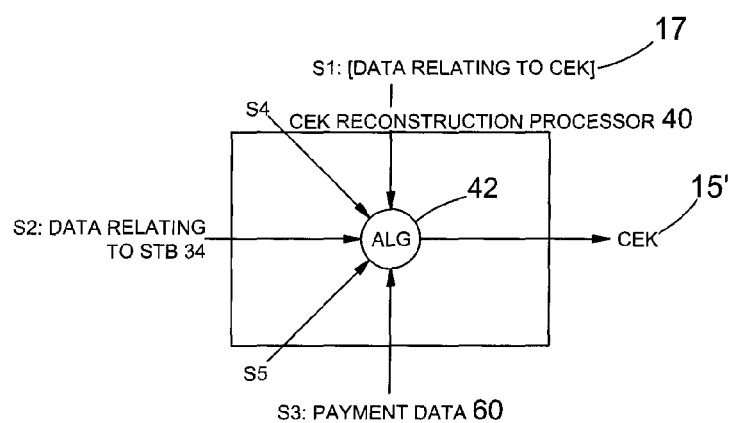
FIG. 2 is a block diagram of a content encryption key reconstruction processor.

The portable device 24.1 is configured to be brought into data communication with the decryption processor housed in a set-top box at the user station 26.1. The data 17 relating to the CEK 15 is share data which is required with other share data to reconstruct a secret, in this case the CEK 15. A content encryption key reconstruction processor 40 (shown in FIG. 2) is configured to utilize a share algorithm 42 and input data comprising the share data 17 relating to the CEK 15 and other share data S2 to S5, to reconstruct the CEK 15 in plain text. The reconstructed CEK is indicated at 15', in FIG. 2. The decryption processor is configured to decrypt the intermediate station encrypted data utilizing the second key 28.12 of the third key pair 28.1 and to use the reconstructed CEK 15', to decrypt the encrypted content data.

Each of the intermediate stations is associated with a respective unique second key pair 16.1 to 16.$n$. The second key pairs are asymmetric. For example, the second key pair 16.1 comprises the first or a public key 16.11 and a second or private key 16.12. The data transmission path 20 is provided between the source 12 and each of the intermediate stations 18.1 to 18.$n$ for forwarding the source encrypted data 11 to a targeted one of the intermediate stations 18.1 to 18.$n$. Each intermediate station comprises a respective processor 22.1 to 22.$n$ for receiving the source encrypted data 11.

Each of a plurality of portable storage device 24.1 to 24.$m$, preferably a general purpose USB memory stick, is associated with a respective user station 26.1 to 26.$m$. Each user station is associated with a respective unique third key pair 28.1 to 28.$m$. The third key pairs are also asymmetric. For example, the third key pair 28.1 comprises the first or a public key 28.11 and a second or private key 28.12.

Each user station 26.1 to 26.$m$ comprises a respective sink device in the form of the set-top box (STB) 34.1 to 34.$m$ or the like providing connectivity in the form of a port 36.1, to enable a user to connect the device 24.1 to the STB 34.1. At the STB, the intermediate station encrypted data is decrypted utilizing the second key 28.12 of the third pair. The decryption processor of the set-top box utilizes the reconstructed CEK 15' to decrypt the CEK encrypted content data. The decrypted content data is played out on the monitor 38.1, preferably directly from the portable device 24.1. In other embodiments the decrypted content data may be copied on a hard disc or other memory device of the STB 34.1.

Figure 3:
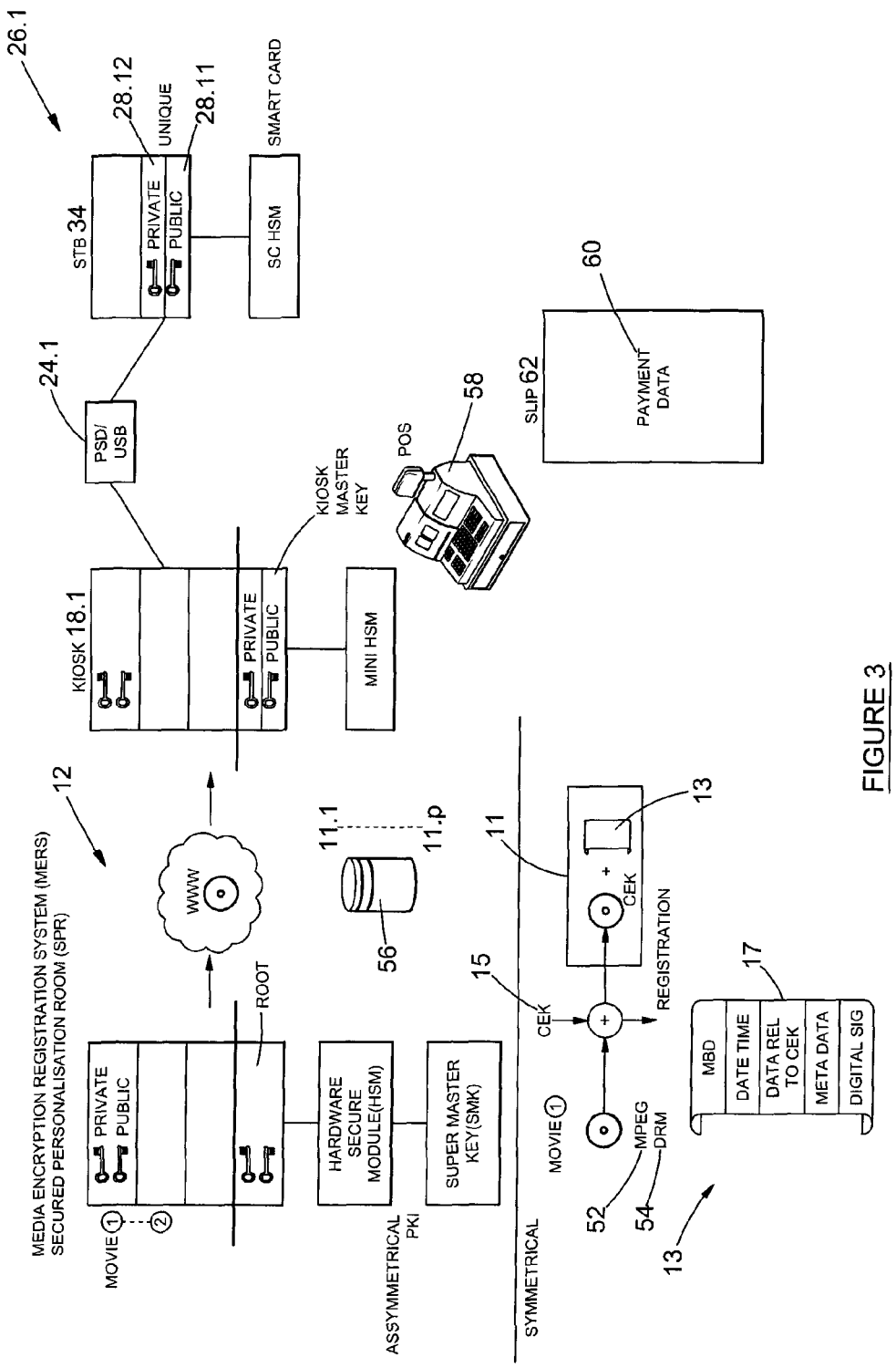
FIG. 3 is a more detailed diagram of the system.

A more detailed diagram of the system is shown in FIG. 3.

It will be appreciated that at the source 12, a plurality p of data items, each comprising different content data, such as different movie or cinematograph film data, may be encrypted with a respective unique CEK 15. As best shown in FIG. 3, before the content data item is encrypted with the CEK associated therewith as hereinbefore described, it may already have been MPEG or the like encoded 52 and/or may comprise data 54 relating to a digital rights management (DRM) regime. The encryption at the source 12 does not affect the aforementioned MPEG encoding or DRM regimes.

Once the content data has been encrypted, metadata comprising production title, running time, content classification, parental control and media type are captured and digitally related to the content data. A unique digital X.509 certificate 13 is created at the Media Encryption Registration System (MERS) and it will have a serial number and a media birth date (MBD). Once the relationship is in place, the prepared content is referred to as a Secured Media File (SMF). The MERS server acts as the root Certificate Authority (CA) and uses the HSM to create PKI key pairs and PKI X.509 certificates to validate and authorize all content protection communication in the system 10.

Any subset of source encrypted data 11.1 to 11.$p$ relating to each of p movie titles may be transferred to any combination of intermediate stations 18.1 to 18.$n$. It will be appreciated that each item of source encrypted data 11 comprises at least movie data encrypted with the unique CEK associated with the movie, and data relating to the CEK encrypted with the public key of the targeted intermediate station contained in the digital certificate 13. The source encrypted data items 11.1 to 11.$n$ are stored in a database 56 at, or, accessible by each intermediate station 18.1 to 18.$n$.

Figure 4:
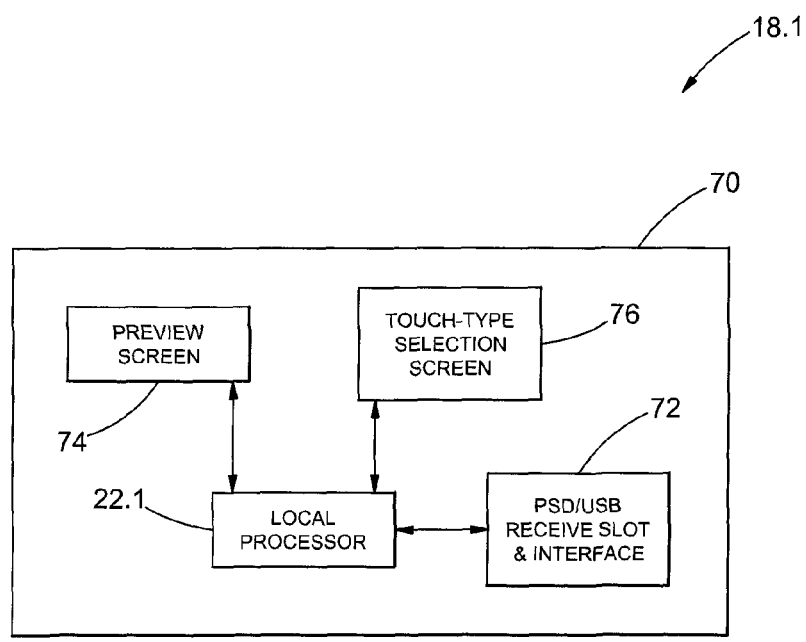
FIG. 4 is a block diagram of an intermediate station forming part of the system.

A basic block diagram of intermediate station 18.1 is shown in FIG. 4. The station may be in the form of a kiosk comprising a housing 70 for the local processor 22.1. Connected to the local processor are a slot and interface 72 for removably receiving a portable data storage device 24.1 to 24.$m$, a preview screen 74 and a touch-type selection screen 76.

A user or subscriber wanting to view one or more of the movies obtainable from the intermediate station, visits the station carrying her potable data storage device 24.1 with her. Prestored in the device, is data relating to the set-top box 34.1 at the user station 36.1 stored in a subscriber media certificate file (MCF). After the user has made her selection and paid for the movie, the intermediate station encrypted data is loaded onto the device.

The MCF is copied to the device 24.1 when the user purchases the device. It is maintained and checked each time it is brought into data communication with an intermediate station. The data contained in the MCF is digitally signed and complements the DRM system. The MCF allows for a convenient method for identifying at the intermediate station without needing to enter any personal information. The MCF has a PIN protection method to prevent or the unauthorized copying of MCF data.

At least share data 60 relating to payment at a point of sale (POS) 58 for a movie together with the share data 17 relating to the CEK 15 are required by the CEK reconstruction processor 40 to reconstruct the CEK 15 associated with the movie and which CEK 15 is eventually used at the decryption processor of the set-top box 34.1, to decrypt the CEK encrypted data relating to the movie. The CEK reconstruction processor 40 may be located at the intermediate station, alternatively at the set-top box.

In one example of direct purchase of a movie at a kiosk 18.1, the subscriber or user of the system 10 has her device 24.1, which contains encrypted in the MCF, data relating to her set-top box 34.1 and the encryption keys on the set-top box 34.1. The system 10 has access to which movie titles she has chosen and also what funds are to be paid, to enable the DRM for a certain duration. Based on this, there are now several pieces of information that form separate random numbers that may all be combined by the algorithm 42, to reconstruct the ultimate secret key or CEK 15 to view the movie. Only at the user station 26.1 or at the set-top box is this information correlated. If any one of the share data elements is not present, the share algorithm 42 will not be able to reconstruct the CEK 15 and thus it would not be possible to view the movie.

Referring to FIG. 1, in another example, the user associated with set-top box 34.1 may want to make the movie title paid for available to a third party for viewing via another set-top box 34.2 at another user station 26.2 associated with the third party. It would be appreciated that the same initial events as in the example hereinbefore take place, except that the user decides to go to the other user station 26.2 and view the movie there. As this would involve a different set-top box 34.2, it is necessary to have a mechanism to identify which parts of the secret will need to be changed, for this case to work. The user or third party will be prompted via the monitor 38.2 to communicate via a return path (shown in FIG. 1), for example via the internet or a path provided by a cellular phone infrastructure, to a head-end, a code that is currently being displayed on the monitor 38.2 at the other user station 36.2. This code carries an encrypted version of the set-top box data of the set-top box at the other station. At the head-end, this code is utilized together with data relating to the movie title, data relating to funds paid and recombined to create the same secret, but with a different set of shares, more particularly the set-top box keys would be different. Once the new share is established, it is communicated back to the user station via the aforementioned return path in the form of an encrypted code. This code is then entered into the other set-top box 34.2 to allow viewing of the movie by means of the other set-top box 34.2 and at the other user station 26.2. The code is entered by the user utilizing a template displayed on the monitor and a keypad, for example a keypad on an infra red (IR) remote control device.

There are many other scenarios that are similar in operation, the idea is to create a strong secret splitting share scheme, which may be distributed through different channels, but ultimately when reconstructed in a secure environment, it creates the CEK.

The invention claimed is:

1. A system for making digital content data available to one of a plurality of end user stations, the system comprising:
   a source comprising a processor for receiving the digital content data and for generating source encrypted data comprising at least the content data encrypted with a key of a content encryption key pair; and share data relating to the key of the content encryption key pair;
   at least the share data relating to the key of the content encryption key pair being encrypted with a first key of a second encryption key pair, which second key pair is associated with a targeted intermediate station;
   a data transmission path between the source and the targeted intermediate station for forwarding the source encrypted data to the targeted intermediate station;
   the targeted intermediate station comprising a processor for receiving the source encrypted data;
   a portable data storage device associated with the end user station, the end user station being associated with a third encryption key pair comprising a first key and a second key;

the processor at the intermediate station being configured to be placed in data communication with the portable storage device and to generate intermediate station encrypted data by decrypting the encrypted share data relating to the key of the content encryption key pair utilizing the second key of the second key pair and encrypting resulting decrypted data utilizing a first key of the third key pair;

the portable storage device being configured to be brought into data communication with a decryption processor at the end user station;

a content encryption key reconstruction processor configured to utilize an algorithm and input data comprising at least one of said share data relating to the key of the content encryption key pair and other data, to reconstruct the content encryption key;

the decryption processor being configured to decrypt the intermediate station encrypted data utilizing the second key of the third key pair and to use the reconstructed content encryption key to decrypt the encrypted content data.

2. A system as claimed in claim 1 wherein the content encryption key pair is a symmetric key pair and the second and third key pairs are asymmetric key pairs.

3. A system as claimed in claim 1, wherein items with different content data are each encrypted with a key of a respective unique content encryption key pair.

4. A system as claimed in claim 1, wherein the intermediate station comprises a publically accessible kiosk.

5. A system as claimed in claim 1, wherein the decryption processor at the end user station is housed in set-top box and wherein the third encryption key pair is associated with at least one of the set-top box, a SIM card and other token associated by the set-top box.

6. A system as claimed in claim 5 wherein the decrypted content data is played out on a monitor connected to the set-top box.

7. A system as claimed in claim 1, wherein the portable data storage device associated with the end user station comprises any one of a USB memory stick, a computer memory stick, a portable computer hard drive and the like.

8. A method of making digital content data available to at least one user station, the method comprising the steps of:

at a source, generating source encrypted data by encrypting the content data with a key of a content encryption key pair; adding share data relating to the key of the content encryption key pair; and encrypting at least the share data relating to the key of the content encryption key pair with a first key of a second encryption key pair, the second encryption key pair being associated with an intermediate station;

forwarding the source encrypted data to the intermediate station;

at the intermediate station, causing intermediate station encrypted data to be generated by decrypting the encrypted share data relating to the key of the content encryption key utilizing a second key of the second encryption key pair and encrypting resulting decrypted data with a first key of a third key pair, which third key pair is associated with the user station; and causing the intermediate station encrypted data to be made available on a portable data storage device, and wherein the content data is caused to be played out on a monitor at the user station, after a content encryption key reconstruction processor has reconstructed the content encryption key from share data which is communicated to the reconstruction processor.

9. A method as claimed in claim 8 wherein the content encryption key pair is a symmetric key pair and the first and second key pairs are asymmetric key pairs.

10. A method as claimed in claim 8, wherein the content data, before it is encrypted, comprises data relating to a digital rights management regime.

11. A method as claimed in claim 8, wherein the share data relating to the key of the content encryption key is added as part of a digital certificate, which certificate is associated with the encrypted content data.

* * * * *